Jan. 10, 1961

B. D. RAFFEL 2,967,796

METHOD OF MAKING TUBULAR STRUCTURES OF
LAMINATED FIBROUS MATERIAL

Filed Sept. 16, 1957

INVENTOR.
BERNARD D. RAFFEL

BY

ATTORNEY

INVENTOR.
BERNARD D. RAFFEL
BY
ATTORNEY

United States Patent Office 2,967,796
Patented Jan. 10, 1961

2,967,796

METHOD OF MAKING TUBULAR STRUCTURES OF LAMINATED FIBROUS MATERIAL

Bernard D. Raffel, Akron, Ohio, assignor to Goodyear Aircraft Corporation, Akron, Ohio, a corporation of Delaware Filed Sept. 16, 1957, Ser. No. 684,315

3 Claims. (Cl. 154—83)

This invention relates to the manufacture of tubular structures of laminated fibrous material and is especially useful in making tubular structures of progressively changing bore such as articles having conical or flared portions. The invention is especially useful in making nozzles for rocket casings or similar bodies of substantially hour-glass or venturi tube shape.

It has been found desirable in the construction of rocket casings to provide a nozzle constructed of laminated glass fibers coatted with plastic material and having a zone of constricted diameter between its terminal portions and preferably gradually increasing in diameter toward such end portions at a desired rate. The production of such a tubular structure has been found difficult, especially where the area of the flaring portions increases rapidly.

Attempts to lay the fibrous material directly over a mandrel with its fibers or cords helically laid have been slow processes and where the conical portions of the mandrel were at a steep angle, the individual strands or rovings would refuse to stay in place or would slide over the steep shoulders of the material.

Attempts to form a tubular body of uniform dimensions and bore and to constrict an area thereof by forming it between dies acting radially of the tube has resulted in pinching of the article with undesirable displacement of material and weakness at the throat portion.

Attempts heretofore to form a tube of uniform bore and then to expand the tube within a die by hydraulic pressure applied axially thereof have also been unsuccessful as the end portions of the article have been axially crushed or weakened as a result of the excessive expansion necessary to be accomplished by axial pressure.

The present invention has for an object to provide a method whereby tubular articles having steeply flared portions may be constructed by winding layers of bias laid fibers about an expansible mandrel and then expanded to the desired shape.

Another object is to provide for partially forming and expanding the article about an expansible mandrel and finishing the article by molding it between relatively rigid die members.

Other objects are to provide an article of maximum strength throughout, to facilitate production, and to provide an accurately formed article.

These and other objects will appear from the following description and the accompanying drawings.

Figure 1:
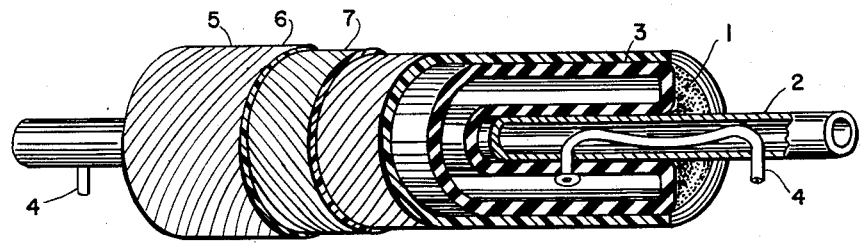
Fig. 1 is a perspective view of a mandrel and layers of fibrous material assembled thereabout for constructing a tubular article, portions of the material and the mandrel being broken away and portions shown in section for illustrative purposes.

Referring to the drawings, and first to Fig. 1 thereof, a mandrel 1 comprises a tubular bar 2 about which is mounted a tubular double-walled expansible bag 3 of elastic rubber or other rubber-like material. An inflation connection 4 is provided whereby the bag 3 may be attached to a supply of hydraulic fluid under pressure to inflate the mandrel to cylindrical form.

About the mandrel, a cylindrical body 5 of fibrous material has been mounted. The body 5 is of unwoven parallel cord or filaments constructed in plies or layers in which the cords or filaments are arranged in parallel and held together in each ply by plastic material. The body is constructed of consecutive layers or plies such as 6 and 7 with the cords or filaments of each ply laid at an angle oblique to the axis of the body and the angle of obliquity being opposite in successive plies. Preferably, the helix angle is kept at less than 45 degrees in each ply and preferably at about 35 degrees to permit relatively great expansion of the plies. While various materials may be used in the construction of nozzles for jet purposes the plies may be of unwoven parallel strands of glass fiber held in place by a thermoplastic or thermosetting plastic material. The plies may each be constructed of bias-cut material having the filaments extending at the desired helical angle. The consecutive plies may all be of the same axial extent or width, usually, as shown, with the plies having a width about equal to the length of the mandrel, or the plies may be of different widths or designed to provide more plies at a certain zone of the article than at another as desired.

As a second step of the operation the mandrel of Fig. 1 with the assembled material thereabout is placed within a female mold 8 which comprises a pair of mold members 9 and 10 secured together, as by bolts 11 and having a cavity 12 formed therebetween. The cavity extends entirely through the mold between the mold members but is not of uniform diameter. In the particular mold shown the cavity has its smallest diameter intermediate its ends and is flared outwardly in both directions therefrom toward larger diameters at the ends of the cavity and may be defined as of hour-glass or venturi tube shape. The smallest diameter is preferably no less than the outside diameter of the assembled body of fibrous material about the mandrel so that the female mold may be passed over the material or at least the female mold may be assembled thereabout without substantial distortion of the material.

After assembly of the female mold about the expansible core and the material thereabout, hydraulic fluid under increased pressure is admitted to the connection 4 to expand the material outwardly against the cavity of the mold. This results in a uniform rearrangement of the filaments or fibers by change of their angular disposition and spacing, especially where change of diameter takes place, without pinching or doubling of the fibers. The filaments are rearranged by a lazy-tong or pantograph action which changes their helical angularity.

Figure 2:
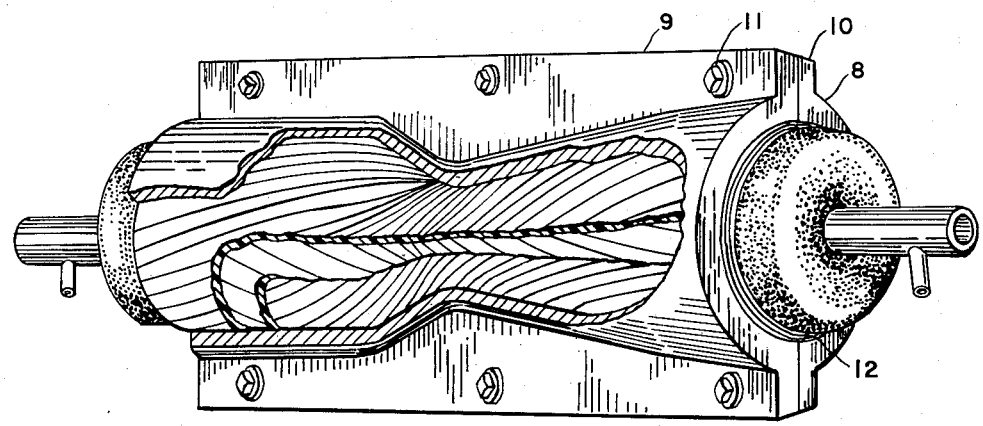
Fig. 2 is a perspective view of a female mold with the mandrel and the material thereabout expanded therewithin, parts of the mold and of the layers of material being broken away and shown in section.

After such preliminary forming in the female mold, as illustrated in Fig. 2, the hydraulic pressure is released and the expansible core is removed. The female mold members 9 and 10 are then disassembled and removed from the article.

Figure 3:
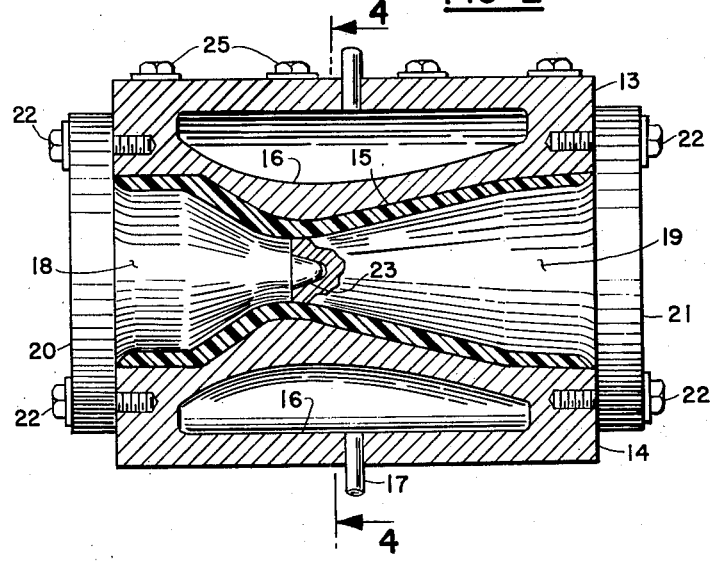
Fig. 3 is a sectional view of a curing mold with the molded article in place therein, part of one core member being broken away to show the dowel connection between two core members.
Figure 4:
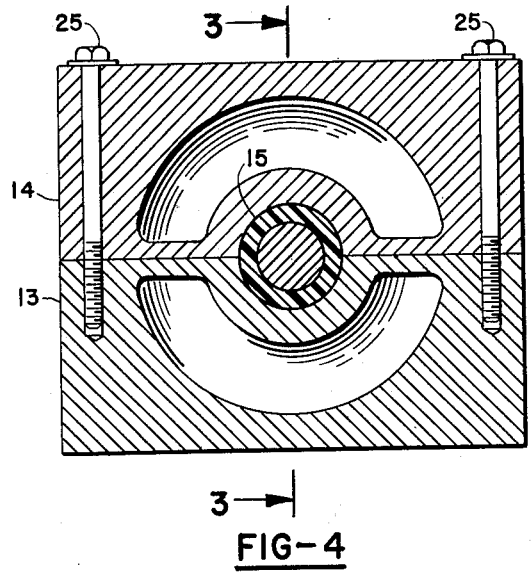
Fig. 4 is a cross-sectional view taken on line 4—4 of Fig. 3, parts being broken away.
Figure 5:
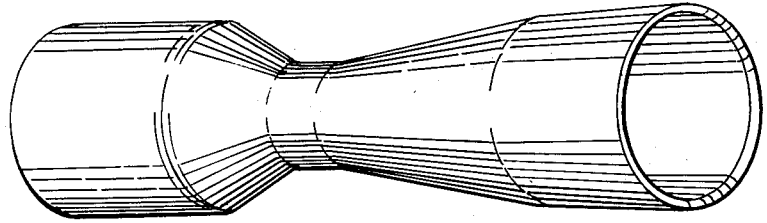
Fig. 5 is a perspective view of the molded article.

A curing mold, such as that shown in Fig. 3 is provided. This comprises a pair of complementary mold members 13, 14 providing therebetween a cavity 15 extending entirely through the mold and of circular cross section throughout but of different diameters at different positions. The cavity is preferably the same size and shape as that of the female mold and is the exact size and shape of the exterior of the desired article. Each of the mold members 13 and 14 is formed with a steam cavity, such as 16, and steam inlet and outlet connections such as 17 are provided to circulate steam through the mold member to heat it. A pair of mold cores 18, 19 are provided which together provide for molding a continuous surface of the interior of the article to the desired shape. Each mold core has a flange 20 or 21 whereby it may be centered and secured to the mold as by bolts 22. The smallest ends of the core members meet at the smallest diameter of the bore of the article and one is formed with an axial dowel pin 23 and the other with an axial socket for aligning the ends of the core members.

The partially formed article removed from the mold 8 is placed between mold members 13, 14 and these are secured to one another as by bolts 25. The core members 18, 19 are then forced axially within the bore of the article and then secured to the mold members 13, 14. Due to the fact that the article has been previously expanded in the mold 8 to substantially its final shape and size, substantially no axial displacement of the material of the article takes place during the final operation. Also the stiffness of the fibers of the material against axial displacement assists in preventing undesirable displacement of these fibers.

Steam or other heated fluid is circulated through the mold at such temperature and for a sufficient length of time to thermoset the plastic material.

Preferably the mold members 13 and 14 are mounted in a molding press and the bolts 25 may then be eliminated. Mold member 13, for example, may be mounted on a stationary platen of the press, mold member 14 may be mounted upon a movable platen or ram of the press, and core members 18, 19 may be mounted on opposite rams mounted to position them in the mold cavity along an axis normal to that of movement of the mold member 14. This greatly speeds up the molding operation.

The expansible mandrel is preferably cylindrical in shape when deflated. However, it is within the invention to employ a mandrel not of uniform diameter throughout its length but having a conical or other normal shape.

It will be seen that the novel invention generally comprises assembling concentric plies of diagonal or bias laid fibrous material about an expansible mandrel, expanding the material into a mold cavity of non-uniform diameter to flare portions thereof at its ends to approximately a desired shape, transferring the article to a cavity of a curing mold, forcing core members into the flared ends of the article to form the article to final shape, and curing the article in male mold.

While a certain representative embodiment and details have been shown for the purpose of illustrating the invention, it will be apparent to those skilled in this art that various changes and modifications may be made therein without departing from the spirit or scope of the invention.

Having thus described my invention, what I claim is:

1. The method of making a tubular structure of substantially hour-glass shape of laminated unwoven filaments and plastic binding material which comprises building about an inflated expansible mandrel in substantially cylindrical shape a substantially cylindrical body of unwoven concentric plies of filaments extending helically in substantially parallel relation with the filaments of each ply having a helix angle of less than 45 degrees and the filaments of successive plies being at opposite angles, confining the body in a passage of substantially the desired hour-glass shape, expanding the body by further increased inflation of the mandrel to conform to such passage by fluid pressure applied therewithin by the inflatable mandrel, removing the mandrel, placing opposed core members in opposite ends of the body, said core members together providing a rigid core having the shape of the interior of the desired article, confining the body and core members in a curing mold having a mold cavity of the desired shape of the exterior of the article, forcing the mold cores axially together to compress and confine the body, and curing the confined body.

2. That method of making a rocket nozzle which includes the steps of providing an inflatable, expansible mandrel, hydraulically inflating the mandrel to substantially cylindrical shape, building a substantially cylindrical body of plastic covered parallel unwoven glass filaments thereon while the mandrel is inflated by wrapping a plurality of bias-cut plies of said plastic covered parallel unwoven glass filaments and of a width about equal to the length of the mandrel about the mandrel, the plies being oppositely laid with the glass filaments of adjacent plies being positioned at opposite angles, said angles being less than 45 degrees with the axis of the mandrel, positioning the mandrel with the body thereon in a female mold having an hourglass shape the smallest diameter of which surrounds the body without compressing it, materially increasing the pressure in the mandrel to pantograph the filaments of the plies and expand the body into substantially complete engagement with the female mold, deflating the mandrel and removing it from the body, opening the female mold and removing the hourglass shaped body, inserting a multi-part male mold in the body while the body retains its hourglass shape to engage with the entire inside area of the body, surrounding the entire exterior of the body with a female mold, and curing the body while so held.

3. That method of making a rocket nozzle of hourglass form having a waist of small diameter and greatly increased end portions which includes the steps of providing an inflatable, expansible mandrel, hydraulically inflating the mandrel to substantially cylindrical shape, building a substantially cylindrical body of plastic covered parallel unwoven glass filaments thereon while the mandrel is inflated to cylindrical shape by wrapping a plurality of bias-cut plies of said plastic covered parallel unwoven glass filaments and of a width about equal to the length of the mandrel about the mandrel, the plies being oppositely laid with the glass filaments of adjacent plies being positioned at opposite angles and the plies being substantially free of tension, positioning the mandrel with the body thereon in a female mold having an hourglass shape the smallest diameter of which surrounds the body without compressing it, increasing the pressure in the mandrel to further expand it radially and to pantograph the filaments of the plies and expand the body into engagement with the female mold, deflating the mandrel and removing it from the body, opening the female mold and removing the hourglass shaped body, inserting a multi-part male mold in the body while the body retains its hourglass shape to engage with the entire inside area of the body, surrounding the entire exterior of the body with a female mold, and curing the body while so held.

References Cited in the file of this patent

UNITED STATES PATENTS

| | | |
|---|---|---|
| 2,515,093 | Mills | July 11, 1950 |
| 2,723,426 | Pelley | Nov. 15, 1955 |
| 2,747,616 | De Ganahl | May 29, 1956 |
| 2,780,273 | Roberts | Feb. 5, 1957 |
| 2,794,481 | Anderson | June 4, 1957 |

FOREIGN PATENTS

| | | |
|---|---|---|
| 15,868 | Great Britain | A.D. 1890 |

OTHER REFERENCES

Plastics, April 1945, pages 70, 72, 74, 75 and 118–120.